United States Patent

[11] 3,633,899

[72] Inventor Bennett O. Blout
 Chicago, Ill.
[21] Appl. No. 882,636
[22] Filed Dec. 5, 1969
[45] Patented Jan. 11, 1972
[73] Assignee Amsted Industries Incorporated
 Chicago, Ill.

[54] PROJECTED AREA FLUID SPRING OR ACTUATOR
 10 Claims, 2 Drawing Figs.

[52] U.S. Cl. ................................................ 267/122
[51] Int. Cl. ................................................ F16f 5/00
[50] Field of Search .................................... 267/65,
 121, 126, 127, 129

[56] References Cited
 UNITED STATES PATENTS
 3,385,590 5/1968 Avner .......................... 267/65

3,549,142 12/1970 Tilton .......................... 267/65

*Primary Examiner*—James B. Marbert
*Attorneys*—Walter L. Schlegel, Jr. and John W. Yakimow ABSTRACT: A piston having a circular head connected to a push rod is located within a cylindrical cavity. A flexible cylindrical diaphragm is connected at one end to the periphery of the head and at the other end to the lower end of the cavity thereby dividing the cavity into two cavities. A pressure differential between the two cavities creates a force on the head moving it downwardly in a known manner. Air in one cavity further passes around the head between the walls of the cylindrical cavity and diaphragm and forces the diaphragm inwardly toward the push rod creating an additive force on the piston that pulls the head toward the lower end of the cylindrical cavity.

PATENTED JAN 11 1972

3,633,899

Inventor:
Bennett O. Blout
By
John Yakimow
Attys

PROJECTED AREA FLUID SPRING OR ACTUATOR

BACKGROUND OF THE INVENTION

This invention relates generally to a piston-housing-type fluid-actuating or spring device for producing or absorbing a relatively great amount of force with a relatively small housing.

Conventional air cylinders are either of the piston-cylinder type where the periphery of the piston engages the inner diameter of the cylinder or of the rolling diaphragm type where a resilient seal is interposed between the piston and the cylinder. Both of these air cylinders are restricted in most cases to machines with low power requirements. Inasmuch as the average available air pressure is 80 to 90 p.s.i., or atmospheric in vacuum applications, it would in some cases be necessary to use a larger bore air cylinder to obtain sufficient power than could be mounted on the machine.

SUMMARY OF THE INVENTION

Applicant has resolved the above problem and others by providing a piston and a housing interconnected by a flexible sleeve. The sleeve is reinforced by cords capable of carrying an axial load.

Air, under pressure, forces the piston through the housing in a known manner to develop a piston force. The air also flows past the piston, applying pressure on the housing wall, and the sleeve, putting the sleeve cords in tension. This sleeve force on the piston, which is additive to the normal piston force, decreases with an increasing amount of arcing or bowing of the cords which results from piston movement.

DESCRIPTION OF THE PREFERRED EMBODIMENT

Figures 1, 2:
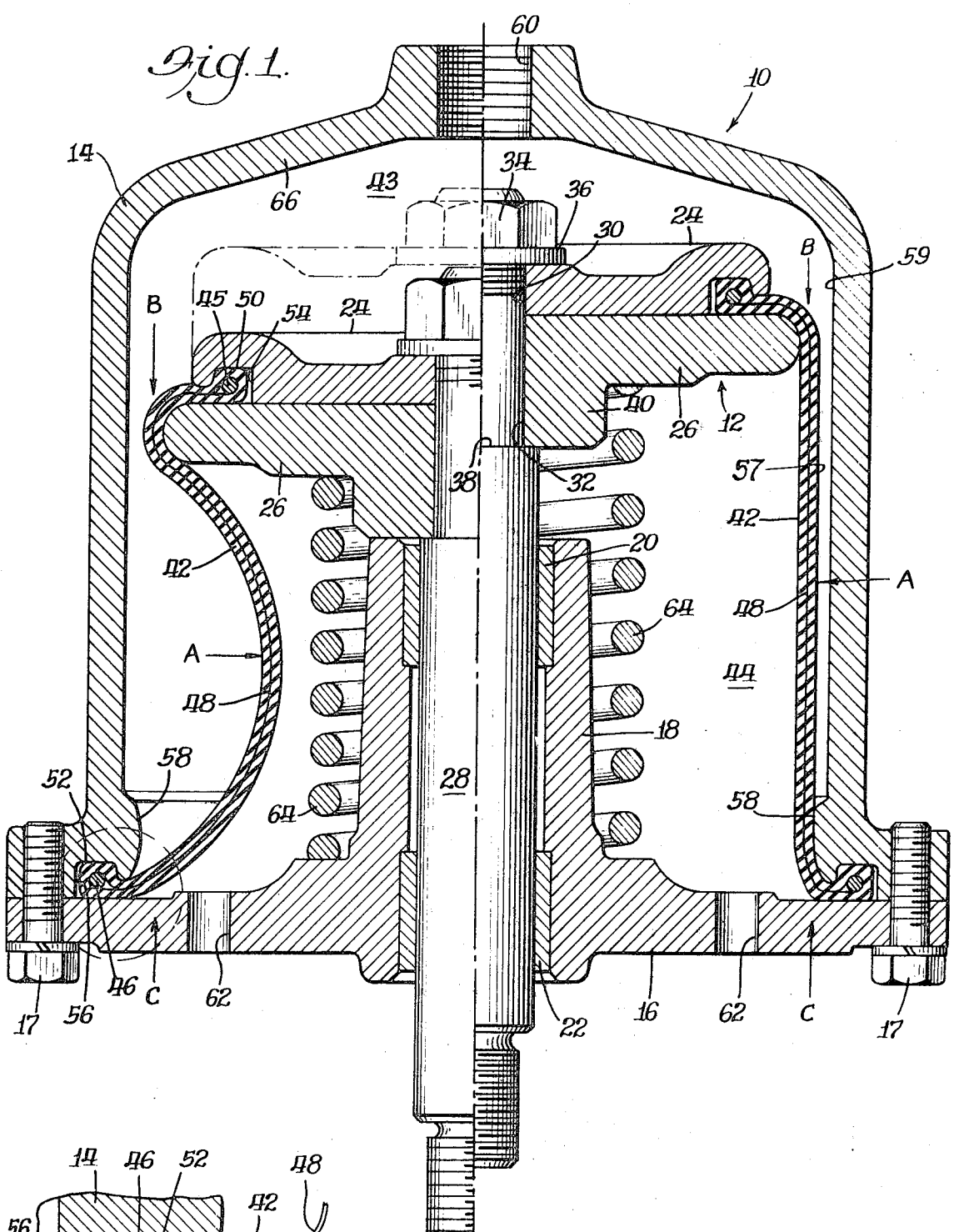
FIG. 1 is a sectional view of an air actuator assembly taken on the centerline of the assembly and illustrating the piston at the start of a stroke and at the end of a stroke.
FIG. 2 is an enlarged view of a portion of FIG. 1.

FIG. 1 illustrates one-half of an actuator assembly 10 showing a piston 12 at the start of a stroke on the right-hand side of the centerline and at the end of a stroke at the left-hand side of the centerline.

The assembly 10 comprises a circular cuplike housing 14 enclosed at the open end by an end plate 16. Spaced bolts 17, e.g., eight in number, are used to secure the end plate 16 to housing 14 forming an airtight seal therebetween. A tubular neck 18, which may be integral with end plate 16, extends into the center of housing 14 a given distance. Bearings 20 and 22 are located at the upper and lower ends of neck 18.

Piston 12 comprises mating, circular upper and lower head plates 24 and 26 interconnected by a push rod 28 that projects through openings 30 and 32 in the center of each plate. A nut 34 and a washer 36 is used to force the two plates together and against a shoulder 38 on push rod 29. Lower head plate 26 has a downwardly projecting circular boss 40 around opening 32. Push rod 28 extends through bearings 20 and 22 and outwardly through the end plate 16.

A flexible, cylindrical diaphragm 42 is shown interconnecting the piston's head plates 24 and 26 with the lower, open end of cuplike housing 14 thereby dividing the housing into two independent cavities 43 and 44. The diaphragm 42 may be made of rubber and have upper and lower circular metal rings 45 and 46 imbedded therein. Cords 48 made of nylon, wire or another flexible material may be imbedded within the diaphragm and interconnect the rings 45 and 46. The diaphragm has a constant cross section throughout its length and enlarged portions 50 and 52 proximate rings 45 and 46. The enlarged portions 50 and 52 may be respectively retained in circular grooves 54 and 56 respectively defined by headplates 24 and 26 and the housing 14 and the end plate 16.

At the start of a stroke, the outer surface 57 of diaphragm 42 is preferably parallel to the inner wall 59 of housing 14 intermediate headplate 26 and groove 56. An inner circular shoulder 58 on housing 14 may aid such parallel alignment by contacting the outer surface 57 of diaphragm 42.

During operation pressurized air is forced into cavity 43 through an opening 60. The air will force the piston 12 toward end plate 16 in a known manner and will further pass around the piston into the space between diaphragm 42 and housing 14 to force the flexible diaphragm inwardly toward push rod 28. This latter, inward movement tends to pull piston 12 toward end plate 16. The cords 48 in diaphragm 42 carry this added axial force.

At the start of the stroke, the added force on the piston 12 created by the diaphragm 42 is much greater than it is at the end of the stroke. Very generally, this reduction in added force may be accounted for by the fact that pressure exerted on the straight diaphragm shown on the right-hand side of FIG. 1 may be represented by a force vector A that is perpendicular to surfaces 57. The force vector A in turn creates a vertical force, represented by force vectors B and C, that draws the headplates 24, 26 and end plate 16 together. This vertical force is, theoretically, infinite in magnitude at the start of a stroke. As the diaphragm moves to the position shown on the left-hand side of FIG. 1, the force vectors B and C are accordingly reduced in magnitude due to the bowing of the diaphragm. In longitudinal cross section, diaphragm 42 will ideally define an arc of a circle when it is bowed.

As the headplates 24, 26 move toward end plate 16 the air in cavity 44 is forced outwardly through vents 62. As shown in FIG. 1 the boss 40 and neck 18 can be used to limit the travel of piston 12.

As the air pressure is reduced in cavity 43 a spring 64 forces the headplates 24, 26 away from end plate 16. Such movement draws air through vents 62 into cavity 44 and the piston 12 again moves to its starting position.

If desired, the assembly 10 may also be actuated by a vacuum. The vacuum line would be connected to vents 62 and the opening 60 would be open to the atmosphere. When a vacuum is created in cavity 44 the atmospheric pressure forces the piston 12 downwardly toward end plate 16 and draws diaphragm 42 inwardly toward push rod 28. The bearings 20 and 22 would have to form an airtight seal with push rod 28 in this embodiment.

Another variation of the invention would be to use assembly 10 as a spring. Opening 60 would be sealed and cavity 43 would be left at atmospheric pressure. Spring 64 would be moved from its illustrated position to a position between headplate 24 and the top 66 of housing 14. In a normal position the assembly 10 would be at the end of stroke position illustrated at the left-hand side of FIG. 1. Force on push rod 28 would be resisted by spring 64 in a known manner. As piston 12 moved toward the top 66 of housing 14 the diaphragm 42 would straighten reducing the enclosed volume of air in cavity 43. Such reduction would increase the pressure and tend to force the diaphragm 42 to its original curved position thereby resisting piston movement. As the piston 12 moved closer to the top 66 of housing 14 the resisting force on diaphragm 42 created by the confined air would increase due to the straightening of the diaphragm and the increased pressure in cavity 43 thereby creating a variable force spring assembly.

It should be noted that when the assembly 10 is used as an actuator, rings (not shown) could be placed intermediate headplate 26 and end plate 16 in cavity 44. The rings could be located to contact the diaphragm 42 after a given amount of inward movement to vary the arclike shape of the diaphragm or create a number of arcs. If desired the rings could be mechanically moved by inner guides (not shown), e.g., from a position adjacent headplate 26 to a position intermediate headplate 26 and end plate 16, to vary the additive force created by the diaphragm.

Although the invention has been described by making detailed reference to preferred embodiments, such detail is to be understood in an instructive rather than in any restrictive sense. Many other variations of the invention are possible.

What is claimed is:

1. An assembly comprising a housing having a main concentric cavity therein and opposed ends; an axially aligned piston in said main cavity having a circular head and a rod connected to said head projecting outwardly through one of said ends and a flexible concentric diaphragm connected at its ends to said head and to one of the ends of said housing and defining with said head independent cavities within said main cavity, said diaphragm being spaced from said housing intermediate the diaphragm's ends whereby the existence of a pressure differential between said independent cavities will force said diaphragm inwardly toward its axis of concentricity.

2. An assembly according to claim 1 wherein said circular head and said end connected to said diaphragm have stops thereon to retain said head and said end connected to said diaphragm at a given distance away from each other.

3. An assembly according to claim 1 wherein a shoulder circles the interior of said housing proximate said connection of said diaphragm to said housing, said shoulder having an inner diameter greater than the outer diameter of said circular head and wherein a cavity-defining surface of said diaphragm contacts the inner diameter of said shoulder and another cavity-defining surface of said diaphragm contacts the outer diameter of said circular head.

4. An assembly according to claim 1 wherein resilient means is located between said head and one of the ends of said housing.

5. An assembly according to claim 1 wherein a ring is located in one of said cavities between said diaphragm and said axis, said ring being movable toward and away from an end of said housing to contact said diaphragm when said diaphragm is moved relative to said axis.

6. In an assembly having a housing with an enclosed longitudinally extending main cavity and a piston having a head portion in said cavity and a rod longitudinally movable along a line into and out of said cavity the improvement comprising a longitudinally extending tubular flexible diaphragm around said rod having side portion which in longitudinal cross section are straight and substantially parallel to said movement of said rod, said diaphragm being spaced from said housing throughout a portion of its length and connected at one end to said head portion and at the other end to said housing within said main cavity to divide said main cavity into two independent enclosed cavities whereby the existence of a lower pressure within the tubular diaphragm around said rod relative to a high pressure outside of the tubular diaphragm will result in the collapse of said diaphragm toward said rod thereby moving said rod out of said cavity.

7. The improvement set out in claim 6 wherein a neck encircles said rod inside of said tubular diaphragm, said neck being connected to said housing and engageable with said head portion after said rod has moved a given distance.

8. The improvement set out in claim 6 wherein said tubular diaphragm is cylindrical substantially throughout its length intermediate its ends.

9. The improvement set out in claim 8 wherein said head portion is circular in lateral cross section, said diaphragm is substantially of one thickness throughout its length between its ends, and a shoulder having a circular opening in lateral cross section is located in said housing within said main cavity between said connection of said diaphragm with said housing and said head portion the inner diameter of said circular opening being substantially equal to the sum of the outer diameter of said head portion and twice the thickness of said diaphragm.

10. The improvement set out in claim 9 wherein a ring is located within each end of said diaphragm and flexible cords are imbedded within said diaphragm and are connected to said rings in said ends.

* * * * *